United States Patent [19]

Worthington et al.

[11] Patent Number: 4,652,432

[45] Date of Patent: * Mar. 24, 1987

[54] PROCESS FOR RECOVERING URANIUM USING AN ALKYL PYROPHOSPHORIC ACID AND ALKALINE STRIPPING SOLUTION

[75] Inventors: Ralph E. Worthington, Winter Haven; Alex Magdics, Lakeland, both of Fla.

[73] Assignee: Prodeco, Inc., Mulberry, Fla.

[*] Notice: The portion of the term of this patent subsequent to Mar. 24, 2004 has been disclaimed.

[21] Appl. No.: 267,672

[22] Filed: May 27, 1981

Related U.S. Application Data

[63] Continuation-in-part of Ser. No. 238,555, Feb. 26, 1981.

[51] Int. Cl.$^4$ .............................................. C01G 43/00
[52] U.S. Cl. ....................................... 423/10; 423/15; 423/17; 423/260
[58] Field of Search ................... 423/8, 10, 15, 17, 260

[56] References Cited

U.S. PATENT DOCUMENTS

| | | | |
|---|---|---|---|
| 2,859,094 | 11/1958 | Schmitt et al. | 23/14.5 |
| 2,866,680 | 12/1958 | Long | 23/14.5 |
| 2,947,774 | 8/1960 | Levine et al. | 260/461 |
| 3,052,513 | 9/1962 | Crouse, Jr. | 23/14.5 |
| 3,835,214 | 9/1974 | Hurst et al. | 423/10 |
| 3,987,145 | 10/1976 | Bruns et al. | 423/10 |
| 4,002,716 | 1/1977 | Sundar | 423/10 |
| 4,238,457 | 12/1980 | Sialino et al. | 423/10 |
| 4,243,637 | 1/1981 | Bradford et al. | 423/10 |
| 4,255,392 | 3/1981 | Chiang | 423/11 |
| 4,311,676 | 1/1982 | Demarthe et al. | 423/10 |
| 4,356,153 | 10/1982 | Bathellier et al. | 423/10 |
| 4,371,505 | 2/1983 | Pautrot | 423/10 |

FOREIGN PATENT DOCUMENTS

| | | |
|---|---|---|
| 0011516 | 5/1980 | European Pat. Off. |
| 2423545 | 11/1979 | France |
| 2435444 | 4/1980 | France |
| 2449652 | 9/1980 | France |
| 2450233 | 9/1980 | France |
| 2459205 | 1/1981 | France |
| 2461681 | 2/1981 | France |
| 2013643 | 8/1979 | United Kingdom |
| 2054545 | 2/1981 | United Kingdom |

OTHER PUBLICATIONS

Skorovarova, "Gidrometallurgicheskaya Pererabotka Uranorudnogo Syr'ye [Hydrometallurgical Treatment of Uranium Ore]", Atomizizdat, Moscow, 1979, pp. 143-145, 150.

Hurst, F. J. et al., "Recovery of Uranium From Wet-Process Phosphoric Acid", *Industr. Eng. Chem. Process, Design, Development*, 1972, v. 11, No. 1, p. 122.

Ellis, D. A., "The Recovery of Uranium From Industrial Phosphoric Acids by Solvent Extraction", DOW-81, 1952.

Hurst et al., "Solvent Extraction of Uranium From Wet-Process Phosphoric Acid", ORNL-TM-2522, Apr. 1969.

List Continued on next page.

*Primary Examiner*—Edward A. Miller
*Attorney, Agent, or Firm*—Fleit, Jacobson, Cohn & Price

[57] ABSTRACT

A process is described for the recovery or uranium from wet-process phosphoric acid utilizing an alkyl pyrophosphoric extractant. The extractant also contains a modifier for retaining the alkyl pyrophosphoric acid ester in solution in an essentially water-immiscible organic diluent during stripping. After extracting the uranium from wet-process acid, the APPA extractant is treated with an oxidizing agent such as hydrogen peroxide and the uranium stripped into an alkaline stripping solution. The alkaline stripping solution is an aqueous solution of an alkali metal or ammonium carbonate unsaturated in uranium. The barren extractant is recycled for contacting with fresh wet-process acid. Any ferric iron present is precipitated in the stripping solution and then separated from the solution. The uranium is precipitated, separated, dried and calcined to a $U_3O_8$ product.

45 Claims, 1 Drawing Figure

OTHER PUBLICATIONS

Zangen, "The Composition of 'OPPA'", *Journal of Inorganic and Nuclear Chemistry*, vol. 16, 1960/61, pp. 165–166.

Zangen et al., "Products of the Reaction Between Alcohols and Phosphorus Pentoxide–Identification by Infrared Spectrophotometry, *Israel Journal of Chemistry*, vol. 5, 1967, pp. 89–100.

Zangen et al., "Product of the Reaction Between Alcohols and Phosphorus Pentoxide: I. Identity and Extractant Efficiency of the Various Products", *Separation Science*, vol. 2, 1967, pp. 187–197.

Zangen et al., "Products of the Reaction Between Alcohols and Phosphorus Pentoxide: II. Chromatographic Separation of the Products", *Separation Science*, vol. 3, 1968, pp. 1–9.

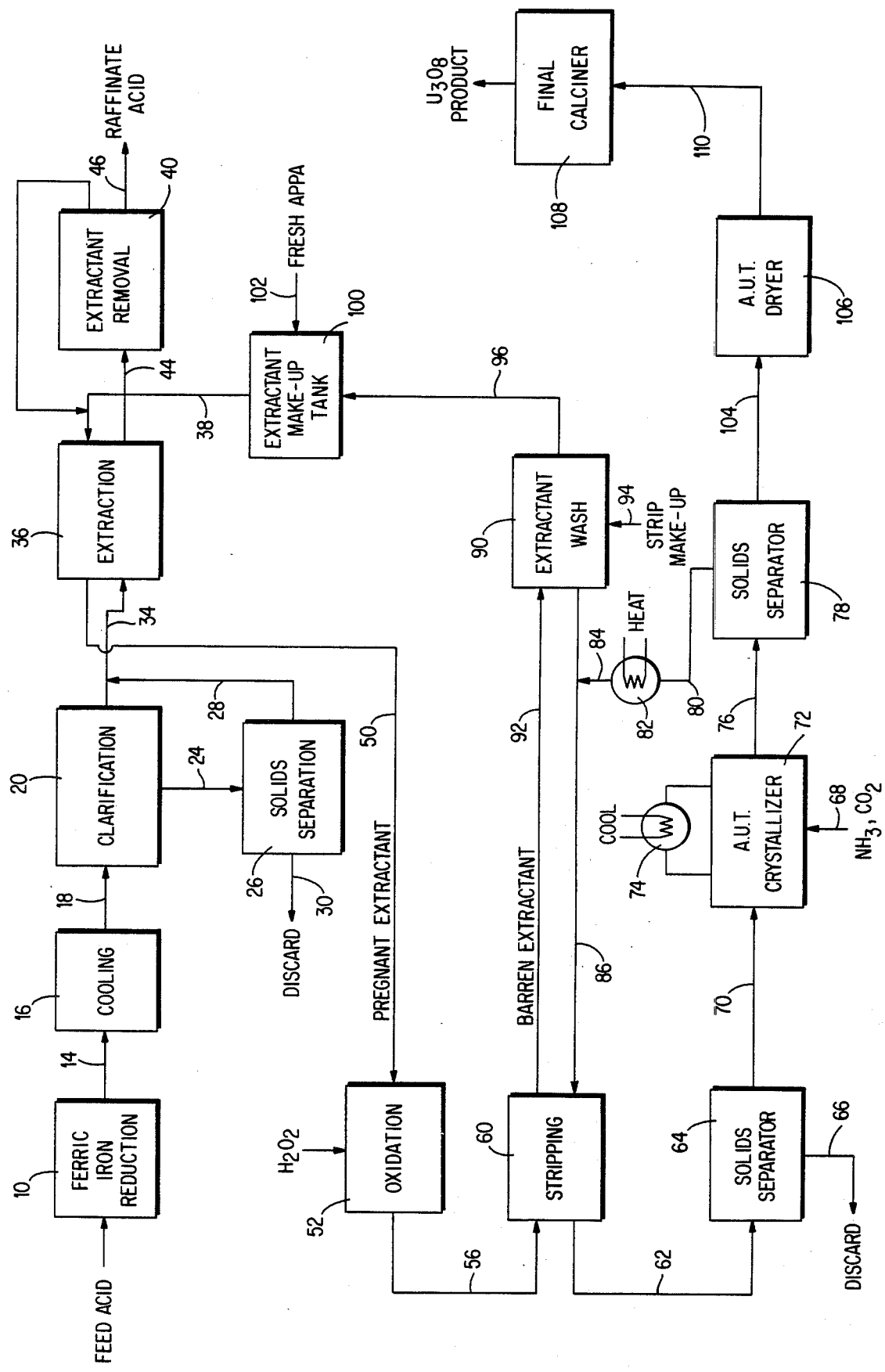

PROCESS FOR RECOVERING URANIUM USING AN ALKYL PYROPHOSPHORIC ACID AND ALKALINE STRIPPING SOLUTION

CROSS-REFERENCE TO RELATED APPLICATION

This is a continuation-in-part of Ser. No. 238,555, filed Feb. 26, 1981, for "Process For Recovering Uranium Using An Alkyl Pyrophosphoric Acid And Alkaline Stripping Solution".

BACKGROUND OF THE INVENTION

Minable phosphate is found in a number of places throughout the world, and in many of these deposits small quantities of uranium are found complexed with the phosphate values. The large phosphate deposit in central Florida, for example, contains from 0.01 to 0.02 weight percent uranium. This uranium is taken into solution when the phosphate is acidulated with mineral acid to produce wet-process phosphoric acid.

The early work on the recovery of uranium from wet-process acid is described in a publication referred to as DOW-81 and entitled "Recovery of Uranium from Industrial Phosphoric Acid by Solvent Extraction". Alkyl pyrophosphoric acid was found to be very efficient in selectively extracting uranium from phosphoric acid and several flow sheets utilizing this type of extractant are shown in U.S. Pat. No. 2,866,680. Prior processes for recovering uranium using a pyrophosphoric acid extractant include processes in which uranium is stripped from the extractant into an acidic stripping solution. It is also known to strip uranium from the extractant into an alkaline stripping solution as disclosed in French Pat. No. 2,423,545. In this process, part of the pyrophosphoric acid ester is stripped into the alkaline stripping solution and is subsequently redissolved in the diluent of the organic extractant solution. A modifier such as a long chain alcohol is added to the extractant for the purpose of retarding hydrolysis of the pyrophosphoric acid esters.

It is an object of the present invention to provide an improved process for recovering uranium from wet-process phosphoric acid using an alkyl pyrophosphoric acid extractant and an alkaline stripping solution.

A further object of the present invention is to provide an improved process for recovering uranium from wet-process acid in which uranium is stripped from an alkyl pyrophosphoric acid extractant into an alkaline stripping solution.

Still a further object of the present invention is to provide a process for recovering uranium from wet-process phosphoric acid using an alkyl pyrophosphoric acid extractant and alkaline stripping solution in which the pyrophosphoric acid esters remain dissolved in the extractant solution during stripping.

Yet a further object of the present invention is to provide a process for recovering uranium from wet-process acid including means for handling any ferric iron which may be precipitated in the alkaline stripping solution and for removing pyrophosphoric acid ester decomposition products from the extractant.

Yet a further object of the present invention is to provide a process for recovering uranium from wet-process acid which contains a high concentration of $P_2O_5$.

A still further object of the present invention is to provide a process for recovering uranium from wet-process acid which is economical and minimizes consumption of costly reagents.

SUMMARY OF THE INVENTION

In accordance with the present invention, uranium is stripped from an organic extractant containing an alkyl pyrophosphoric acid such as isodecyl pyrophosphoric acid as the extractant agent into an alkaline stripping solution. The pyrophosphoric acid ester in the organic extractant is dissolved in a suitable essentially water-immiscible organic diluent such as kerosene. The organic extractant contains tetravalent uranium extracted from wet-process phosphoric acid. The organic extractant also contains an alcohol or phenol modifier added to the organic extractant in a quantity sufficient to retain the pyrophosphoric acid esters in a solution in the diluent during stripping. The maximum quantity of modifier added to the organic extractant is about 1 mole of the modifier per phosphorus (P) atom contained in the organic extractant. This quantity of modifier corresponds to the theoretical quantity necessary for hydrogen bonding of each oxygen doubly bonded to a phosphorus atom.

The organic extractant is treated with an oxidizing agent such as hydrogen peroxide to oxidize the tetravalent uranium in the pregnant extractant. The extractant is then stripped with the alkaline stripping solution which comprises an aqueous solution of an alkali metal or ammonium carbonate such as an aqueous solution of ammonium carbonate. During contact between the alkaline stripping solution and the pregnant organic extractant, uranium is stripped from the extractant into the stripping solution. Because of the presence of the modifier in the organic extractant, however, the pyrophosphoric acid esters remain dissolved in the diluent in the organic extractant. The uranium concentration in the stripping solution is maintained below saturation so that the uranium does not precipitate during stripping.

The barren organic extractant is preferably washed to remove any stripping solution entrained in the extractant and then is recycled for contacting with fresh wet-process acid. Fresh pyrophosphoric acid ester is added to the recycled barren organic extractant. In this manner, the extraction coefficient of the extractant is maintained at a relatively high level.

Ferric iron is typically extracted into the organic extractant during contact with the wet-process phosphoric acid even when reduced acid is employed. A portion of this ferric iron is stripped into the alkaline stripping solution during contact between the organic and aqueous phases during stripping and is precipitated in the stripping solution. Also precipitated in the stripping solution are pyrophosphoric acid ester decomposition products from the extractant. After separating the precipitates from the stripping solution, the uranium can be precipitated as the ammonium uranyl tricarbonate, and then decomposed thermally to yield high-grade $U_3O_8$.

BRIEF DESCRIPTION OF THE DRAWINGS

The FIGURE is a schematic flow sheet illustrating the recovery of uranium from wet-process phosphoric acid.

DESCRIPTION OF THE PREFERRED EMBODIMENTS

Wet-process phosphoric acid is obtained by the acidulation of uncalcined phosphate rock with sulfuric acid and can contain about 20 to 55% $P_2O_5$ by weight, more typically about 25 to 50% $P_2O_5$. Wet-process acid normally contains about 28 to 32% $P_2O_5$ by weight, but can typically contain about 40 to 45% $P_2O_5$ if produced by the hemi-hydrate process. The wet-process acid is treated so that ferric iron in the acid is reduced to the ferrous state. Since the oxidation state of the iron tends to control the oxidation state of the uranium, substantially all of the uranium will be in the reduced tetravalent state even at relatively high ferric iron concentrations. However, to minimize ferric iron interference with extraction and stripping, the ferric iron should be reduced such that the ferric iron concentration is at least about 8 g/l or below, preferably at least about 6 g/l or below.

The manner in which the ferric iron is reduced is not critical. The ferric iron can be reduced using a chemical reductant such as iron metal, silicon metal, or an iron-silicon alloy commonly referred to in the art as a ferrosilicon alloy having a silicon content from about 5 to 100% by weight, preferably about 5 to 80% by weight, and most preferably about 5 to 20% by weight. The ferric iron also can be reduced using electrolytic reduction. In the reduction step, $Fe^{+3}$ is reduced to $Fe^{+2}$ and any $U^{+6}$ to $U^{+4}$. As indicated above, it is not necessary that all of the $Fe^{+3}$ be reduced to the lower valence state in order to effectively extract the uranium from wet-process acid. Thus, the extent to which the ferric iron concentration in the wet-process acid is reduced is a question of economics based on the overall uranium recovery process.

The reduced wet-process acid is cooled using any conventional technique such as cooling water or an evaporator. The temperature of the wet-process acid is typically about 60° to 80° C. It is preferred to cool the acid to about 55° C. or below, more preferably about 30° to 50° C. Cooling the acid increases the extraction coefficient during extraction, decreases the rate of hydrolysis of the extractant and improves the uranium recovery process. Again, however, the extent to which the acid is cooled, if any, is a question of economics based on the overall uranium recovery process.

The cooled wet-process acid is clarified to at least partially remove inorganic solids such as calcium sufate (gypsum) and organic solids such as humics. There are several techniques known in the art for clarifying wet-process acid and any of these techniques can be employed. For example, a rake tank classifier or Lamella clarifier can be employed to clarify the acid. The clarification step may employ a separate solids separation unit. Preferably, the clarified acid is then passed through a polishing filter to reduce the solids concentration to about 20 parts per million (ppm) or less.

The uranium in the clarified acid is extracted with an alkyl pyrophosphoric acid (APPA). The various APPA extractants that can be used include those disclosed in U.S. Pat. No. 2,866,680. The APPA extractants are the reaction product of phosphoric oxide and an alcohol which typically has a chain length of from 4 to 20 carbon atoms, preferably from 6 to 12 carbon atoms. The reaction product is a complex mixture, as indicated by "Products of the Reaction Between Alcohols and Phosphorus Pentaoxide: Identity and Extraction Efficiency of the Various Products", M. Zangen, Y. Marcus and E. D. Bergmann, *Separation Science*, (2), pp. 187–197, 1967. Methods for preparing the APPA extractants are disclosed in U.S. Pat. Nos. 2,866,680 and 2,947,774 the disclosures of which are expressly incorporated herein by reference. It is preferred to form APPA extractants using essentially the method disclosed in U.S. Pat. No. 2,947,774.

The APPA extractant is dissolved in an essentially water-immiscible organic diluent. Suitable diluents include, for example, aliphatic hydrocarbons, petroleum fractions low in aromatics, and chlorinated hydrocarbons. The preferred diluents are refined high-boiling, high-flash point pertroleum fractions containing between 10 and 50% by volume naphthenes with the balance being principally aliphatic.

The APPA concentration in the extractant solution is generally about 10 to 100 g/l. The concentration of APPA in the extractant solution which is used in practice will be determined by various factors including the ferric iron concentration in the wet-process acid and the temperature to which the acid is cooled.

The extractant solution contains a modifier to retain the salts of APPA formed during stripping in solution in the diluent. The modifier is any essentially water-immiscible alcohol or phenol which is soluble in the diluent and contains an —OH group which will bond to the doubly bonded oxygen on the phosphate grouping of the pyrophosphoric acid by hydrogen bonding. The alcohol can be aliphatic or substituted aliphatic or alicyclic alcohol containing 4 to 20, preferably 6 to 12, carbon atoms. Preferably, the same or a similar chain length alochol is used as a modifier as is used to prepare the APPA (e.g., an octanol modifier is used when octanol is used to prepare octyl pyrophosphoric acid). The phenol can be a substituted or unsubstituted phenol. The preferred phenols are nonylphenol and octylphenol, both of which are commercially available.

The modifier is added to the organic extractant in a quantity sufficient to retain the APPA salts formed during stripping in solution in the diluent. Since the modifier depresses the extraction coefficient of the pyrophosphoric acid ester, the maximum quantity of modifier added to the organic extractant is controlled to maximize the solubility of the APPA salts in the diluent while avoiding the addition of modifier which would unnecessarily depress the extraction coefficient of the APPA extractant. The maximum quantity of modifier added to the organic extractant is about one mole of the modifier per phosphorus (P) atom contained in the organic extractant. This quantity of modifier corresponds to the theoretical quantity necessary for hydrogen bonding of each oxygen doubly bonded to a phosphorus atom.

The maximum quantity of modifier added to the organic extractant is defined in terms of the phosphorus atom concentration since the APPA extractant is a complex mixture which may contain a number of ingredients in addition to the diesters of pyrophosphoric acid. Referring specifically to the diesters of pyrophoshoric acid, the maximum quantity of modifier theoretically required for hydrogen bonding of each oxygen doubly bonded to a phosphorus atom is 2 moles of modifier per mole of diester since each mole of the diester contains two phosphorus atoms. Generally, the weight ratio of the modifier to the APPA required to retain the APPA salts formed during stripping in solution in the diluent and yet avoid any unnecessary depression of the extraction coefficient will be about ½ to ⅔, preferably about ½ to ⅔.

The extraction can be accomplished in a batch operation or in a continuous manner concurrently or countercurrently with countercurrent flow preferred. Apparatus for accomplishing intermixing and separation of two substantially immiscible phases are well-known in the art and any conventional apparatus can be used for this purpose. It is preferred to operate the extraction in the aqueous continuous mode usng a 3 to 8 stage, preferably 5 to 8 stage, countercurrent uranium extraction unit. In general, the volume ratio of the wet-process acid to the extractant solution during extraction should be about 1 to 10:1.

After extraction, the wet-process acid is returned to the acid producer for additional processing to make "merchant acid", which is either sold or used to manufacture a variety of products, chiefly fertilizers. Preferably, any extractant entrained in the wet-process acid during extraction is removed from the wet-process acid before the acid is returned to the acid producer. The entrained extractant can be removed by any conventional technique including the use of one or more flotation cells.

The uranium in the APPA extractant is oxidized and the uranium converted from the tetravalent state to the hexavalent state in the extractant. The preferred oxidizing agent is hydrogen peroxide; however, other oxidizing agents such as sodium chlorate could be employed. The hydrogen peroxide is preferably added to the extractant as an about 25 to 50% by volume aqueous solution. The amount of oxidizing agent added should be in excess of the stoichiometric amount required to oxidize the uranium content of the extractant to the +6 state ($UO_2^{++}$).

In the next step of the process, the extractant is stripped of its uranium content by contacting the extractant with an alkaline stripping solution to strip uranium and precipitate any ferric iron and orthoesters derived from the extractant such as by hydrolysis of the pyrophosphoric acid ester. The alkaline stripping solution is an aqueous solution of an alkali metal or ammonium carbonate. The preferred stripping solution is an ammonium-ion containing solution such as an aqueous ammonium carbonate solution. The terminology "carbonate" also is intended to encompass bicarbonate.

The uranium concentration in the alkaline stripping solution is maintained below saturation so that the uranium stripped into the stripping solution will not coprecipitate with the iron and orthoesters. In general, the pH of the alkaline stripping solution should be about 8 to 12, preferably about 9 to 10. For example, if an ammonium carbonate solution is used, it should be about 0.5 to 3M. The temperature in the stripping stage will normally be about the same as the temperature to which the acid is cooled prior to extraction.

The stripping can be accomplished in a batch operation or in a continuous manner concurrently or countercurrently with countercurrent flow preferred. It is preferred to operate the stripping using a 1 to 3 stage, preferably 2 stage, countercurrent stripping unit. In general, the volume ratio of the alkaline stripping solution to the extractant solution during stripping should be between about 0.3 to 6:1.

The APPA extractant is washed to remove any alkaline stripping solution entrained in the extractant. Preferably, this is accomplished in a separate washing step in which the extractant is washed with make-up for the alkaline stripping solution. For example, the extractant is washed with an aqueous ammonium carbonate solution.

The washed extractant is recycled for contact with fresh wet-process acid. Prior to contact with the acid, however, fresh APPA extractant, appropriately diluted with diluent, is combined with the barren extractant to make up for physical losses and to maintain the extraction coefficient at a relatively high level during the next extraction cycle. The APPA concentration of the fresh extractant is typically about 20 to 1000 g/l, preferably about 400 to 600 g/l. Modifier also is added to the recycled barren extractant as required to maintain the desired modifier concentration.

The recycled barren extractant stream may, if desired, be acidulated with mineral acid such as phosphoric acid prior to being recontacted with wet-process acid in extraction. The acidulation converts the APPA extractant from its salt form (e.g., ammonium form) to its acid form. Otherwise, the extractant will be acidified during the first stages of contact with the wet-process acid.

The alkaline stripping solution, after being separated from the extractant, is fed to a solids separator such as a conventional centrifuge or filter. The precipitate, containing iron and orthoesters is separated from the alkaline stripping solution in the solids separator. The alkaline stripping solution containing the uranium is fed to a crystallizer for quantitative precipitation of uranium as ammonium uranyl tricarbonate (AUT) at about 15° C. to 30° C. The uranium precipitate is separated from the aqueous solution in a conventional solids separator such as a centrifuge or filter. The aqueous solution is heated to the desired stripping temperature and recycled, and the uranium precipitate dried in a dryer and calcined in a calciner, both of which are conventional and preferably indirectly fired.

As an alternative to the above processing sequence, the solution remaining after separation of the iron and orthoester solids can be heated instead of cooled to drive off ammonia and carbon dioxide and precipitate uranium quantitatively as uranyl carbonates. The precipitate is filtered off, dried and calcined.

In order to facilitate an easier understanding of the uranium recovery stages of the present invention, a flow sheet illustrating the process if provided in the FIGURE. Wet-process phosphoric acid is introduced into ferric iron reduction unit 10 and the ferric iron concentration reduced. The reduced wet-process acid is introduced via line 14 into cooling unit 16 in which the acid is cooled. After cooling, the acid is fed via line 18 to clarification unit 20. The solids separated in clarification unit 20 are fed via line 24 to solids separator 26. In the separator 26, residual acid is separated from the solids and recycled to extraction via line 28. The separated solids are fed to disposal via line 30.

The clarified acid is introduced via line 34 into a countercurrent uranium extraction unit 36, while an APPA extractant solution containing a modifier is introduced into the unit via recycle line 38. After extraction, the raffinate acid is fed to extractant removal unit 40 via line 44. The raffinate acid is returned to the acid producer via line 46 to be processed into "merchant acid". The extractant removed from the raffinate acid in extractant removal unit 40 is recycled to extraction via line 48.

The extractant, now rich in uranium, is fed via line 50 to oxidation unit 52 and then into stripping unit 60 via line 56, while an ammonium carbonate stripping solution unsaturated in AUT is introduced into the unit via recycle line 86. After being stripped of its uranium content, the extractant from stripping unit 60 is fed to extractant wash unit 90 via line 92. Stripping solution make-up is fed to extractant wash unit 90 via line 94 and then fed to stripping unit 60 via line 86.

Fresh APPA extractant is introduced into extractant make-up tank 100 via line 102. Also introduced into extractant make-up tank 100 via line 96 is extractant from extractant wash unit 90. The resulting fresh extractant solution is recycled to uranium extraction unit 40 via recycle line 38.

The ammonium carbonate stripping solution from stripping unit 60 is fed via line 62 to solids separator unit 64. The solids separated in solids separator 64 are fed to disposal via line 66. The resulting stripping solution is introduced into the AUT crystallizer unit 72 via line 70. In AUT crystallizer unit 72 the solution is cooled by cooling unit 74 to crystallize AUT. Ammonia and carbon dioxide make-up are introduced into the AUT crystallizer unit via line 68. The solution containing the crystallized AUT is fed to solids separator unit 78 via line 76. After removal of the solids from solids separator unit 78, the stripping solution is fed via line 80 to heating unit 82. The heated solution is then fed to recycle line 86 via line 84.

The AUT solids, removed from solids separator unit 78 via line 104, are dried in AUT drier unit 106 after which the dried solids are fed to the final calciner unit 108 via line 110. In the final calciner unit 108, the AUT solids are decomposed thermally to yield a high-grade $U_3O_8$ product.

To facilitate a better understanding of the advantages and operation of the present invention, the following examples are provided to specifically illustrate the invention:

EXAMPLE 1

Wet-process phosphoric acid was fed to a three-stage countercurrent extraction unit at a flow rate of 44 ml/min. The wet-process acid contained 188 mg/l total uranium, 3.95 g/l ferric iron, and 29.5% $P_2O_5$ by weight and had a temperature of 55° C. The wet-process acid was contacted in the extraction unit at an aqueous to organic ratio of 4:1 for 40 minutes per cycle with an extractant solution containing 70 g/l isodecyl pyrophosphoric acid in a kerosene base. The extractant solution also contained 58 ml/l isodecanol modifier. The flow rate of the extractant solution was 11 ml/min. The pregnant extractant was oxidized with a 50% by volume aqueous solution of hydrogen peroxide which was introduced into the pregnant extractant at a flow rate of 0.08 ml/min.

The pregnant extractant was introduced into a two-stage countercurrent stripping unit and contacted with a 2 molar aqueous solution of ammonium carbonate at a temperature of 55° C. and an organic to aqueous ratio of 2:1. The flow rate of the ammonium carbonate solution was 5.5 ml/min and the solution had a pH of 9.3 to 9.8. A bleed stream was removed from the barren extractant downstream of the stripping unit at a flow rate of 0.13 ml/min, and fresh extractant solution was added to the barren extractant downstream of the bleed stream at a flow rate of 0.13 ml/min. The fresh extractant solution contained 500 g/l isodecyl pyrophosphoric acid and 0.7 ml/l isodecanol modifier. The barren extractant was then returned to extraction.

The ammonium carbonate stripping solution exiting the stripping unit was filtered and a make-up stream added to the filtrate. The make-up stream comprised ammonia, carbon dioxide, and water. The filtrate was cooled to 20° C. and the AUT crystals formed were filtered. The filtrate was heated to 55° C. and recycled to stripping. A make-up stream of ammonia, carbon dioxide and water was added to the recycled filtrate prior to stripping to adjust the pH to 9.3 to 9.8.

The process was continued until the extractant had completed 11 cycles of combined extraction and stripping. A steady state analysis was as follows. The raffinate acid contained 1 mg/l total uranium, 3.8 g/l ferric iron and 29.5% $P_2O_5$ and had a flow rate of 44 ml/min. The total uranium and ferric iron concentrations of the pregnant extraction were 919 mg/l and 1.8 g/l, respectively. The bleed stream contained 76 mg/l total uranium and 1.2 g/l ferric iron. The stripping solution after contact with the extractant contained 256 mg/l total uranium, 300 mg/l ferric iron and 20 g/l orthoesters. The solids filtered out of the stripping solution before cooling comprised 100 mg/min iron and orthoesters, and the solids filtered out after cooling comprised 22 mg/min AUT.

EXAMPLE 2

Wet-process phosphoric acid was fed to a three-stage countercurrent extraction unit at a flow rate of 44 ml/min. The wet-process acid contained 164 mg/l total uranium, 5.2 g/l ferric iron, and 46.1% $P_2O_5$ by weight and had a temperature of 50° C. The wet-process acid was contacted in the extraction unit at an aqueous to organic ratio of 4:1 for 40 minutes per cycle with an extractant solution containing about 85 g/l isodecyl pyrophosphoric acid in a kerosene base. The extractant solution also contained 58 ml/l isodecanol modifier. The flow rate of the extractant solution was 11 ml/min. The pregnant extractant was oxidized with a 50% by volume aqueous solution of hydrogen peroxide which was introduced into the pregnant extractant at a flow rate of 0.04 ml/min.

The pregnant extractant was introduced into a single stage stripping unit and contacted with a 2 molar aqueous solution of ammonium carbonate at an aqueous to organic ratio of 5:1. The flow rate of the ammonium carbonate solution was 55 ml/min and the solution had a pH of 9.5 and contained 2614 mg/l uranium. A bleed stream was removed from the barren extractant downstream of the stripping unit at a flow rate of 0.81 ml/min, and fresh extractant solution was added to the barren extractant downstream of the bleed stream at a flow rate of 0.81 ml/min. The fresh extractant solution contained 135 g/l isodecyl pyrophosphoric acid and 52 ml/l isodecanol modifier. The barren extractant was then returned to extraction.

The ammonium carbonate stripping solution exiting the stripping unit was filtered and the filtrate was adjusted back to 2M ammonium carbonate by the addition of an aqueous ammonium carbonate solution and cooled to 20° C. The AUT crystals formed were filtered. The filtrate was recycled to stripping.

The process was continued for 11 cycles. A steady state analysis after the fourth cycle was as follows. The raffinate acid contained 38 mg/l total uranium, 5 g/l ferric iron and 46.1% $P_2O_5$ and had a flow rate of 44 ml/min. The total uranium and ferric iron concentrations of the pregnant extractant were 508 mg/l and 1.3 g/l, respectively. The bleed stream contained 164 mg/l total uranium and 0.9 g/l ferric iron. The stripping solution after contact with the extractant contained about 2614 mg/l total uranium, and 0.2 g/l ferric iron. The solids filtered out of the stripping solution before cooling contained about 5% iron and about 29% $P_2O_5$. The AUT solids formed analyzed about 39% actual total uranium and 1.8% $P_2O_5$ and 0% total iron. The analyzed 39% actual compared with a theoretical uranium content of 43%.

As will be readily understood by those of ordinary skill in the art, minor modifications may be made in the process described above without in any way departing from the spirit and scope of the invention. Accordingly, it is understood that the invention will not be limited to the exact details disclosed hereinbefore, but will be defined in accordance with the appended claims.

What is claimed is:

1. A process for stripping uranium from a pregnant organic extractant comprising an alkyl pyrophosphoric acid dissolved in a substantially water-immiscible organic diluent, said organic extractant containing tetravalent uranium and an alcohol or phenol modifier in a quantity sufficient to retain substantially all the unhydrolyzed alkyl pyrophosphoric acid in solution in said diluent during stripping, comprising adding an oxidizing agent to said organic extractant to and thereby oxidizing the tetravalent uranium to the +6 state in said organic extractant, and contacting said organic extractant containing said uranium in the +6 state with a stripping solution comprising an aqueous solution of an alkali metal or ammonium carbonate, nonsaturated in uranium, thereby stripping uranium from said organic extractant into said stripping solution, and separating the resulting barren organic extractant containing substantially all of the unhydrolyzed alkyl pyrophosphoric acid dissolved in said diluent, from said stripping solution containing said stripped uranium, said barren extractant being suitable for recycle.

2. The process of claim 1 in which said alkyl pyrophosphoric acid is a reaction product of phosphoric oxide and an alcohol containing 4 to 20 carbon atoms.

3. The process of claim 2 wherein said alcohol contains 6 to 12 carbon atoms.

4. The process of claim 1 in which said organic extractant contains about 10 to 150 g/l of said alkyl pyrophosphoric acid.

5. The process of claim 1 in which said modifier is an essentially water-immiscible alcohol or phenol which is substantially soluble in said diluent and contains an —OH group which will bond to said alkyl pyrophosphoric acid by hydrogen bonding.

6. The process of claim 5 in which said alcohol is an aliphatic or substituted aliphatic or alicyclic alcohol containing 4 to 20 carbon atoms.

7. The process of claim 6 in which said alcohol contains 6 to 12 carbon atoms.

8. The process of claim 1 in which said organic extractant contains a maximum of about 1 mole of said modifier per atom of P contained in said organic extractant.

9. The process of claim 1 in which said oxidizing agent is hydrogen peroxide.

10. The process of claim 1 in which said stripping solution is an ammonium-ion containing solution.

11. The process of claim 10 in which said ammonium-ion containing solution is an aqueous ammonium carbonate solution.

12. The process of claim 1 in which said stripping solution has a pH of about 8 to 12.

13. The process of claim 12 in which said pH is about 9 to 10.

14. The process of claim 1 in which the weight ratio of said modifier to said alkyl pyrophosphoric acid is about ½ to ¾.

15. A process for stripping uranium from an organic extractant comprising an alkyl pyrophosphoric acid dissolved in an essentially water-immiscible organic diluent, said organic extractant containing tetravalent uranium and ferric ion and an essentially water-immiscible alcohol or phenol modifier having at least one —OH group capable of hydrogen bonding with said alkyl pyrophosphoric acid, said modifier being present in said organic extractant in a concentration sufficient to retain substantially all the unhydrolyzed alkyl pyrophosphoric acid in solution in said diluent during stripping and being present in a maximum concentration of 1 mole per atom of P present in said organic extractant, comprising adding an oxidizing agent to said organic extractant and thereby oxidizing said tetravalent uranium to the +6 state in said organic extractant, contacting said organic extractant containing said uranium in the +6 state with a stripping solution comprising an aqueous solution of an alkali metal or ammonium carbonate, nonsaturated in uranium having a pH of about 8 to 12, thereby stripping uranium and ferric iron from said organic extractant and precipitate said stripped uranium and said stripped ferric iron in said stripping solution, and separating the resulting barren organic extractant containing substantially all of the unhydrolyzed alkyl pyrophosphoric acid from said stripping solution containing said precipitated uranium and ferric iron, barren extractant being suitable for recycle.

16. The process of claim 15 in which said alkyl pyrophosphoric acid is a reaction product of phosphoric oxide and an alcohol containing 4 to 20 carbon atoms.

17. The process of claim 16 in which said alcohol contains 6 to 12 carbon atoms.

18. The process of claim 15 in which said organic extractant contains about 10 to 100 g/l of said alkyl pyrophosphoric acid.

19. The process of claim 15 in which said modifier is an alcohol containing 4 to 20 carbon atoms.

20. The process of claim 19 in which said alcohol contains 6 to 12 carbon atoms.

21. The process of claim 15 in which said oxidizing agent is hydrogen peroxide.

22. The process of claim 15 in which said stripping solution is an ammonium-ion containing solution.

23. The process of claim 22 in which said ammonium-ion containing solution is ammonium carbonate.

24. The process of claim 15 in which said pH of said stripping solution is about 9 to 10.

25. The process of claim 15 in which said organic extractant has a temperature of about 55° C. or below.

26. A process for recovering uranium from wet-process phosphoric acid comprising contacting wet-process phosphoric acid containing tetravalent uranium with an organic extractant to extract said tetravalent uranium from said wet-process phosphoric acid, said organic extractant comprising an alkyl pyrophosphoric acid dissolved in an essentially water-immiscible organic diluent and a modifier to retain substantially all the unhydrolyzed alkyl pyrophosphoric acid in solution in said diluent during stripping, separating said organic extractant containing said tetravalent uranium from said wet-process phosphoric acid, adding an oxidizing agent to said pregnant organic extractant and thereby oxidizing said tetravalent uranium to the +6 state in said organic extractant, contacting said pregnant organic extractant containing said uranium in the +6 state with a stripping solution comprising an aqueous solution of an alkali metal or ammonium carbonate, nonsaturated in uranium, thereby stripping uranium from said pregnant organic extractant into said stripping solution, separating the resulting barren organic extractant containing substantially all of the unhydrolyzed alkyl pyrophosphoric acid from said stripping solution containing said stripped uranium, and recycling said barren organic extractant for contacting with fresh wet-process phosphoric acid.

27. The process of claim 26 in which said barren organic extractant is washed to remove any stripping solution entrained in said extractant.

28. The process of claim 26 in which fresh alkyl pyrophosphoric acid and diluent is added to said recycled barren organic extractant.

29. The process of claim 28 in which modifier also is added to said recycled barren organic extractant.

30. The process of claim 26 in which said recycled barren organic extractant is reacidulated with a mineral acid.

31. The process of claim 26 in which said stripped uranium is precipitated in said stripping solution, said precipitate is separated from said stripping solution, and said stripping solution is recycled for contact with pregnant organic extractant.

32. The process of claim 31 in which ferric iron and alkyl pyrophosphoric acid decomposition products also are precipitated in said stripping solution.

33. The process of claim 32 in which said ferric iron and decomposition product precipitates are separated from said stripping solution before uranium is precipitated.

34. The process of claim 33 in which said uranium is precipitated by cooling.

35. The process of claim 33 in which said uranium is precipitated by heating.

36. The process of claim 34 or 35 in which said precipitated uranium is dried and calcined to form a final U308 product.

37. A process for recovering uranium from wet-process phosphoric acid comprising contacting wet-process phosphoric acid containing tetravalent uranium with an organic extractant to extract said tetravalent uranium from said wet-process phosphoric acid, said organic extractant comprising an alkyl pyrophosphoric acid dissolved in an essentially water-immiscible organic diluent and a modifier to retain substantially all the unhydrolyzed alkyl pyrophosphoric acid in solution in said diluent during stripping, said modifier being present in said organic extractant in a weight ratio relative to said alkyl pyrophosphoric acid of about ½ to ¾, separating said organic extractant containing said tetravalent uranium from said wet-process phosphoric acid, adding an oxidizing agent to said pregnant organic extractant and thereby oxidizing said tetravalent uranium to the +6 state in said organic extractant, contacting said pregnant organic extractant with a stripping solution comprising an aqueous solution of an alkali metal or ammonium carbonate, unsaturated in uranium, thereby stripping uranium from said pregnant organic extractant into said stripping solution and precipitate said uranium in said stripping solution, separating the resulting barren organic extractant containing substantially all of the unhydrolyzed alkyl pyrophosphoric acid from said stripping solution containing said stripped uranium, recycling barren organic extractant for contacting with fresh wet-process phosphoric acid, treating a portion of said recycled barren organic extractant to separate diluent and modifier from the remainder of said organic extractant, adding fresh alkyl pyrophosphoric acid to said separated diluent and modifier to form fresh organic extractant, adding said fresh organic extractant to said recycled barren organic extractant, separating said precipitated uranium from said stripping solution, and recycling said stripping solution for contacting with fresh pregnant organic extractant.

38. The process of claim 37 in which ferric iron and alkyl pyrophosphoric acid decomposition products also are precipitated in said stripping solution.

39. The process of claim 38 in which said ferric iron and decomposition product precipitates are separated from said stripping solution before said uranium is precipitated.

40. The process of claim 39 in which said uranium is precipitated by cooling.

41. The process of claim 39 in which said uranium is precipitated by heating.

42. The process of claims 40 or 41 in which said precipitated uranium is dried and calcined to form a final U308 product.

43. A process for recovering uranium from wet-process phosphoric acid having a high $P_2O_5$ concentration comprising contacting said wet-process phosphoric acid containing tetravalent uranium with an organic extractant to extract said tetravalent uranium from said wet-process phosphoric acid, said organic extractant comprising an alkyl pyrophosphoric acid dissolved in an essentially water-immiscible organic diluent and a modifier to retain substantially all the unhydrolyzed alkyl pyrophosphoric acid in solution in said diluent during stripping, separating said organic extractant containing said tetravalent uranium from said wet-process phosphoric acid, adding an oxidizing agent to said pregnant organic extractant and thereby oxidizing said tetravalent uranium to the +6 state in said organic extractant, contacting said pregnant organic extractant containing said uranium in the +6 state with a stripping solution comprising an aqueous solution of an alkali metal or ammonium carbonate, nonsaturated in uranium, thereby stripping uranium from said pregnant organic extractant into said stripping solution, separating the resulting barren organic extractant containing substantially all of the unhydrolyzed alkyl pyrophosphoric acid from said stripping solution containing said stripped uranium, and recycling said barren organic extractant for contacting with fresh wet-process phosphoric acid.

44. The process of claim 43 in which said wet-process acid has a $P_2O_5$ concentration of 40 to 55% by weight.

45. The process of claim 43 in which said wet-process acid has a $P_2O_5$ concentration of 40 to 45% by weight.

* * * * *